United States Patent [19]

Backhus

[11] Patent Number: 4,940,338

[45] Date of Patent: Jul. 10, 1990

[54] DEVICE FOR THE MIXING OF COMPOST

[76] Inventor: Friedrich Backhus, Wischenstrasse 23, 2905 Edewecht Jeddeloh II, Fed. Rep. of Germany

[21] Appl. No.: 357,538

[22] Filed: May 26, 1989

[30] Foreign Application Priority Data

May 28, 1988 [DE] Fed. Rep. of Germany ....... 3818206

[51] Int. Cl.⁵ .............................................. B01F 15/00
[52] U.S. Cl. ...................................... 366/345; 37/212; 180/6.7
[58] Field of Search .................. 366/345, 346; 37/209, 37/210, 212, 218; 180/6.7, 9.1

[56] References Cited

U.S. PATENT DOCUMENTS

| | | | |
|---|---|---|---|
| 303,311 | 8/1884 | Morgan | 37/212 |
| 505,366 | 9/1893 | Mc Adam | 37/212 |
| 957,503 | 5/1910 | Ferguson | 37/212 |
| 3,856,276 | 12/1974 | Pannell | 366/345 |
| 4,758,355 | 7/1988 | Levine | 366/345 |

Primary Examiner—Robert W. Jenkins
Attorney, Agent, or Firm—Collard, Roe & Galgano

[57] ABSTRACT

A mobile device for turning over or mixing accumulations of organic waste materials, such as compost at fixed dump sites, having a steerable chassis with working tracks enabling it to advance through the accumulations of material. The device has a mechanism for mixing the waste picked up while it drives through the waste, and after being thoroughly mixed, redepositing the waste behind the device. The device includes a clearing mechanism disposed on the front side of the chassis and in the area in front of each of the working tracks of the chassis, for clearing a track path as the chassis moves through the waste material. The clearing mechanism avoids the need for laying down separate tracks and comprises a mixing mechanism with a guide shield disposed in front of the intake in the mixing mechanism and clearing tools disposed on a guide surface with the mixing mechanism. The clearing tool has a disk which is driven by a drive element, such as a hydraulic motor, for rotating the disks in front of the guide surface so that excavating projections, which are provided on the disks, clear a path in front of the chassis and move the waste material into the space between the tracks so that it can be picked up mixed and redeposited behind the device.

7 Claims, 3 Drawing Sheets

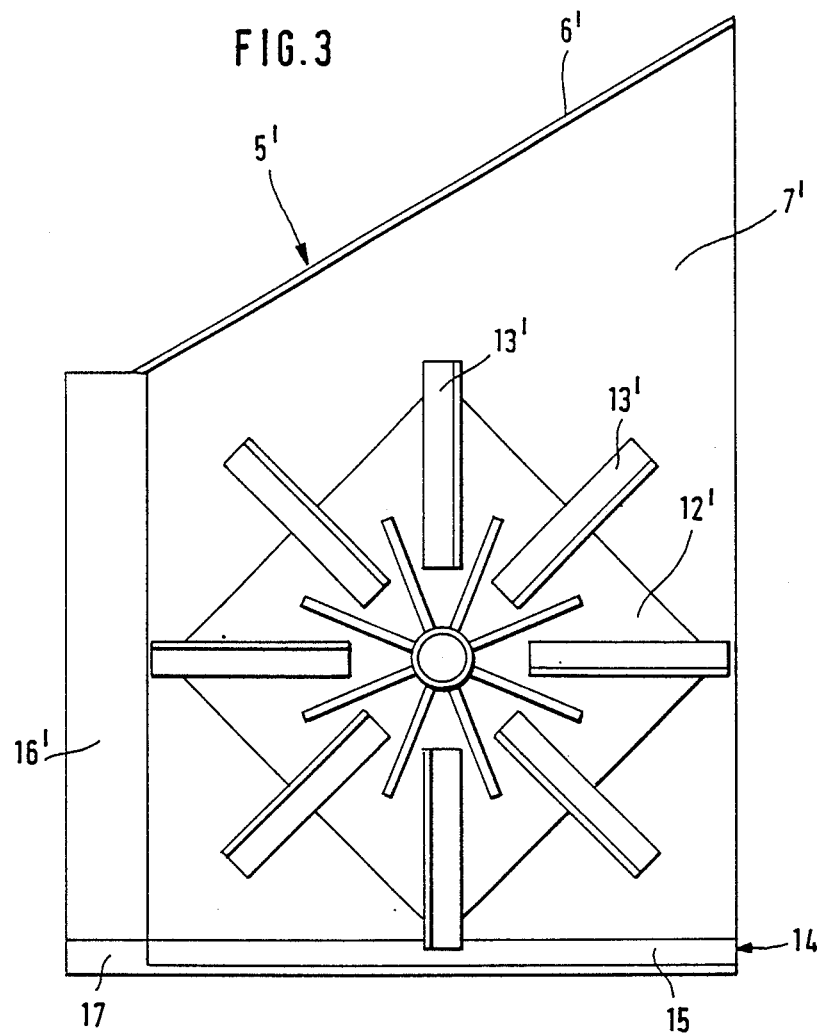

4,940,338

DEVICE FOR THE MIXING OF COMPOST

This invention relates to a mobile device for the mixing or turning over of accumulations of organic waste materials to compost maturing at fixed dump sites. It includes a steerable chassis enabling the device to advance through an accumulation of waste, and has a mechanism for mixing the waste picked up while driving through it. When thoroughly mixed, the device redeposits the waste materials behind the device.

DISCUSSION OF THE PRIOR ART

Compost can be produced by natural decomposition processes from organic waste materials. Composting can also be implemented on an industrial scale if sufficient quantities of organic waste materials are made available. In a conventional method for the production of compost on an industrial scale, the waste materials are accumulated in large quantities at fixed dumping sites. At these sites, the ground surface is completely covered with material and usually accumulated in bank-shaped stacks to form rows of banks.

Because the waste materials must be regularly mixed and aerated during the composting process, a suitable device must be used to turn over the large quantities. This device must be able to travel through the dump site and, continuously pick up, mix, aerate and unload the waste materials, with the freshly mixed waste being deposited behind the device to mature until the next turn-over operation.

Devices are known in the art which are either tractor-drawn or configured as self-propelled vehicles. The devices, known in the art, require vehicle tracks in order to be able to transfer to the ground the traction needed to advance. Heretofore, vehicle tracks have been laboriously laid down by hand, and shoveled clear among the deposited waste. Vehicle tracks can, from the very outset, be left exposed between the individual rows of the bank-shaped accumulations. However, they take up a substantial portion of the available dump and deposit surface. Thus, with inexpensive bulk materials like compost, this results in a substantial economic drawback.

The manual labor in laying down clean vehicle tracks is similar to the labor required for the cleaning of vehicle tracks left exposed from the very beginning prior to each passage of the device. This enables the hygienically questionable waste materials to be turned over while avoiding recontamination of the compost from not fully matured waste left behind in the tracks of the vehicle.

BRIEF DESCRIPTION OF THE INVENTION

An object of the invention is to provide a mobile device for turning over compost that eliminates having to lay down vehicle tracks prior to every passage of the device over the material to be mixed.

In the invention, a clearing mechanism is mounted on the front of the device, in front of each working track of the chassis. The arrangement of clearing mechanisms on the front of the device allow the device to clear away its own track in front of the chassis during its forward movement, while waste materials lying in the area defined by the track width of the chassis are picked up, thoroughly mixed and re-deposited behind the device. Thus, even with waste deposited in the form of banks, the individual banks can still touch each other at their footings and the device can move through the material without prelaid tracks, or even overlap one another. Moreover, the distance between the rows can be kept relatively small because the device clears its own track between the banks. Consequently, there is a substantial advantage of a greater utilization of the deposit site surface area on which the deposited waste materials mature to compost.

The chassis can also bring full traction to bear on the ground surface on top of vehicle tracks which have been cleared with the result that adequate propulsion forces can be generated to ensure the vehicle's advance through the waste materials to be turned over.

The performance of the device, in a further embodiment, can be increased in that each clearing mechanism includes a guide shield laterally disposed in front of the intake of the mixing mechanism whose guide surface is outfitted with active working clearing tools.

The shape of the clearing mechanisms with the guide shields which define the working or intake area of the device has the advantage that quantities of waste materials cleared out of the area of the working tracks of the chassis to form and clear the vehicle tracks for the device can also be fed, on the front side of the device, to the intake area of the mechanism for mixing. This ensures that no residual amounts are left lying behind, which in a disadvantageous manner, could lead to a recontamination of the compost. The active clearing tools on each guide shield facilitate the device's passage through the accumulation of waste. Owing to the active clearing tools, it is also possible to drive through flat deposits of waste with the device, turn the waste over and re-deposit it behind the device, in bank-like stacks.

Each clearing tool is preferably a disk which is coupled to a drive element, and rotates in front of the guide surface, and is provided with excavating projections or flanges. The disk can be made to rotate very simply. Larger surface areas can also be encompassed and excavated in an expedient manner, whereby the projections function as excavating and cutting tools.

Each projection is, for example, configured as a strip which extends radially with respect to the disk, and projects out of the disk's plane. The strips are arranged on the disk so that they also function as a guide to selectively divert the waste picked up, into the intake area of the mixing mechanism, on the front-side of the device.

Each clearing tool can be driven by any suitable drive element. Preferably, hydraulic motors are provided as the drive elements so that the drive unit, providing the motorized operation of the device, can provide the required hydraulic pressure to power the clearing tool drive elements.

According to another further development, the clearing mechanism is pivotally hinged about a vertical axis on the outer corner of the device. Thus, the clearing mechanisms can be easily folded in, and reduced to a size to allow the device to be transported along the street on a flatbed truck. The device can thus be easily transported and used even at fixed dump sites which are separated at substantial distances from each other.

Furthermore, each clearing mechanism can be vertically raised and lowered. This provision has the advantage that the distance between the lower edges of the clearing mechanism and the ground over which the chassis of the device moves can be adjusted. The layout of the components which make the raising and lowering of the clearing device possible is preferably designed so that when the device moves over the fixed dump site, it is raised by means of a working cylinder, and is only lowered the moment mixing operations are commenced. Preferably, the working cylinder that effects the lifting and lowering is brought into a free wheeling or floating position during the mixing operation so that the clearing mechanism can also glide the device without difficulty over uneven ground.

To improve clearing effectiveness, and in particular, to prevent recontamination from waste quantities left behind, a scraper strip is arranged on the lower edge of each guide surface. The material for the scraper can, for example, be rubber. The scraper strip scrapes as the device advances over the ground surface of the fixed dumping site, clearing, the tracks cleared away by the clearing mechanism in front of the chassis of waste left behind.

Additionally, the front, open edge of each guide surface is extended by a guide plate. The guide plate is at an angle to the guide surface so that during operation, it is approximately aligned in parallel with the longitudinal axis of the device. The guide plates define the lateral working area of the device. The guide plates pierce into the deposited waste quantities practically like a rolling colter as soon as the device works through the waste materials to be turned over. The guide plates further prevent waste lying on the side, outside of the working area of the device from slipping back. The guide plates consequently perform the function of fenders as well.

During the mixing operations with the device, the clearing mechanism, with its lower edge, should be in contact with the ground surface of the fixed dump site if at all possible. It is guided, for all practical purposes, like a scraper over this ground surface in order to provide the proper clearing and cleaning of the requisite vehicle tracks for the chassis of the device. Behind the clearing mechanism, there is a wear strip arranged on the lower edge of each guide plate. The guide plates of the clearing mechanism scrape with the wear strips over the ground surface of the fixed dump site, so that each clearing mechanism supports its own weight on the ground via the wear strip. The material for each wear strip is preferably steel, so that each wear strip is supported on the guide plate associated with it, and is easily interchanged. Worn out wear strips can be easily replaced.

Other objects and features of the present invention will become apparent from the following detailed description considered in connection with the accompanying drawings which disclose the embodiments of the invention. It is to be understood that the drawings are designed for the purpose of illustration only and not as a definition of the limits of the invention.

BRIEF DESCRIPTION OF THE DRAWING

In the drawings, wherein similar reference characters denote similar elements throughout the several views:

FIG. 3 is a detail view of a guide surface of the guide shield of the device's clearing mechanism, as seen in the direction of arrow III of FIG. 2.

DETAILED DESCRIPTION OF THE INVENTION

Figure 1:
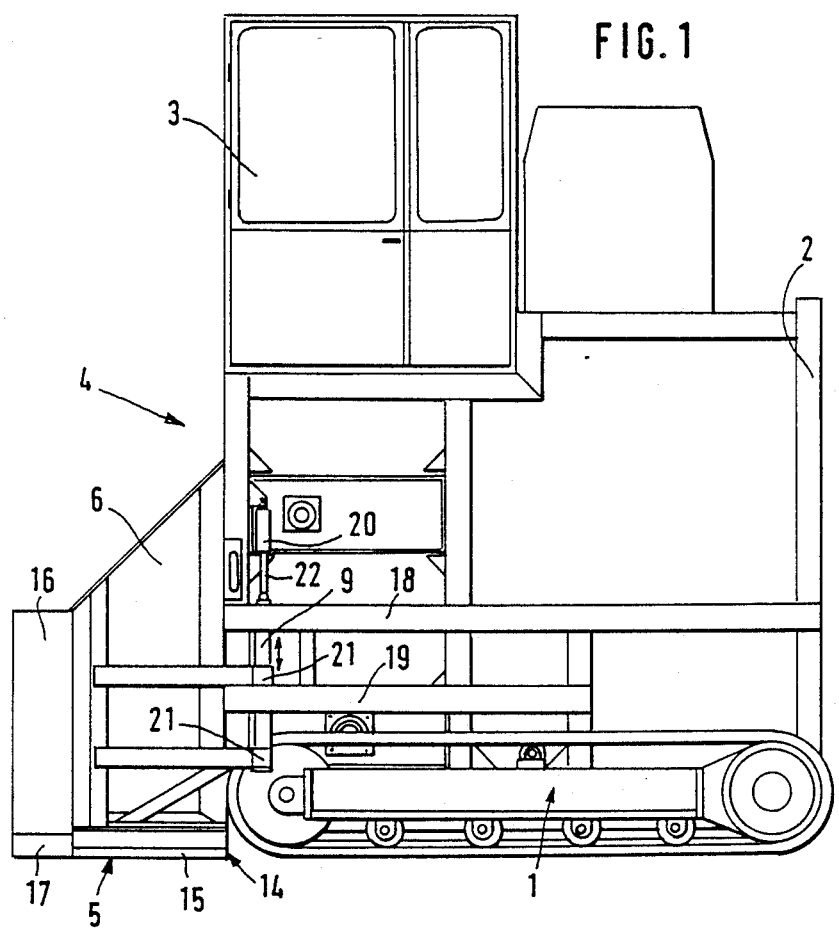
FIG. 1 is a side plan view of a device for turning-over or mixing waste materials maturing to compost.

Referring to FIG. 1, there is shown a device for turning-over or mixing organic waste materials that mature to compost at fixed dump sites. The device is equipped with a standard chassis 1, such as a caterpillar chassis, and carries a mechanism (not shown) for mixing quantities of waste that is picked up when it drives through deposited waste materials. The quantities are thoroughly mixed and aerated at the back 2 of the device, and are discharged and re-deposited. The device has a drive unit (not shown), and is equipped with a driver's cab 3 and is consequently designed to be a steerable, self-propelled vehicle. A clearing mechanism 5 is disposed on the front side of device 4 in the area in front of each working track of chassis 1. Each clearing mechanism has a guide shield 6 laterally disposed in front of the intake of the mixing mechanism whose guide surface 7 is outfitted with active working clearing tools 8.

Figure 2:
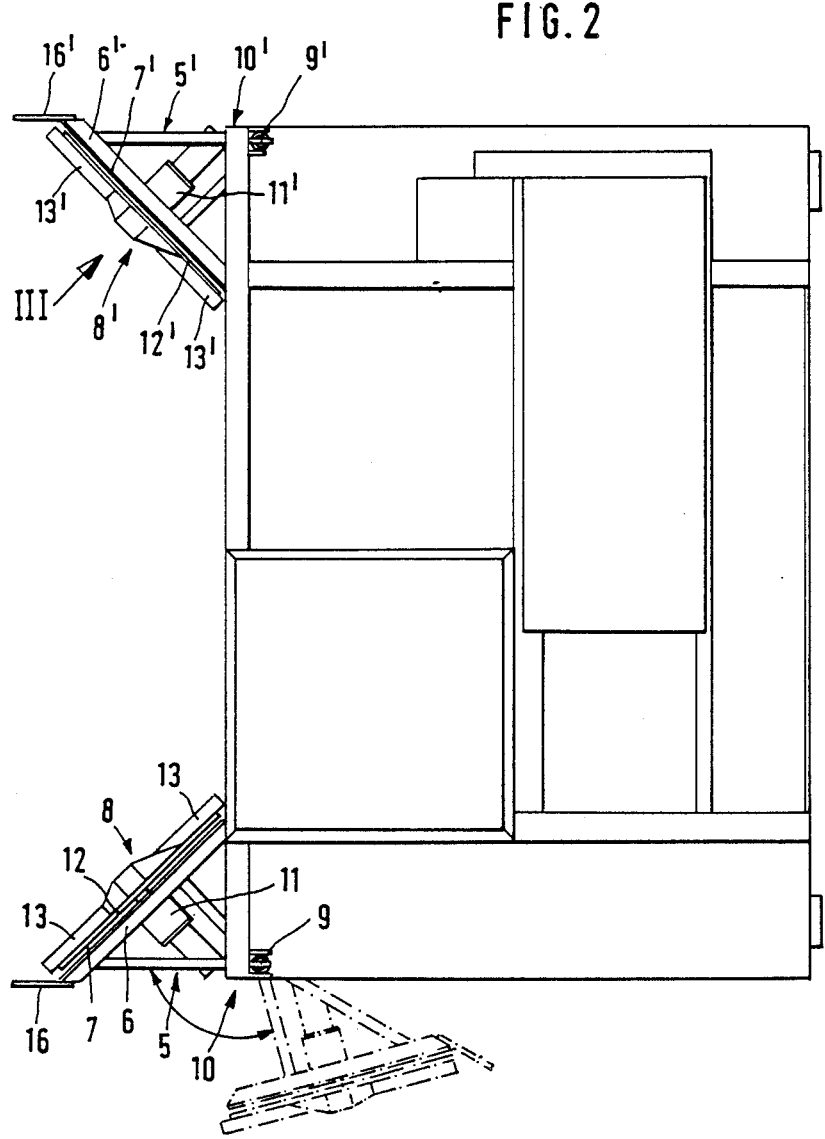
FIG. 2 is a top plan view of the device according to FIG. 1.

FIG. 2 shows a top view of the device according to FIG. 1, whereby the laterally arranged clearing mechanisms 5, 5' can be seen with their guide shields 6, 6' with guide surfaces 7, 7' and active working clearing tools 8, 8'.

Each clearing mechanism is hinged about a vertical axis 9, 9' in the area of an outside corner 10, 10' on the device. Thus, each clearing mechanism can be folded in. The clearing mechanism 5 is represented in FIG. 2 in the folded-in position by dashed lines.

Each active working clearing tool 8, 8' consists of a disk 12, 12' coupled to a drive element 11, 11' rotating in front of guide surfaces 7, 7'. The disks are provided with excavating projections. Each projection is configured as a flange or strip 13, 13' which extends radially to disk 12, 12', and projects out of the disk plane. A hydraulic motor has been provided as the drive element 11, 11, and can be powered by the motor of the device.

The shape of the active clearing tools is further shown in FIG. 3 along the direction of arrow III of FIG. 2. Identical parts are designated in FIG. 3 by the same reference numbers. As can be seen in FIG. 2 and FIG. 3, strips 13 and 13' are L-shaped profiles, by virtue of which fact they also function as projections in addition to their cutting and clearing function during the rotation of the active working clearing tools.

A scraping strip 15, made of rubber, is mounted on the lower edge 14 of each guide surface 7, 7' of each clearing mechanism 5, 5'. Moreover, the front, open edge of each guide surface 7, 7' is extended by a guide plate 16, 16' which is at an angle to the guide surface. During operation the guide plate is approximately aligned in parallel to the longitudinal axis of the device. A wear strip 17, made of steel, is mounted on the lower edge of each guide plate 16, 16'.

Finally, as shown in FIGS. 1 and 2, each clearing mechanism 5 and 5' pivots about its vertical axes 9, 9', and can be raised and lowered along the axes. Axis 9, shown in FIG. 1, is supported in a laterally displaceable position in struts 18 and 19 of the device. A working cylinder 20 has been provided to generate the lateral shifting movement. Each clearing device 5 is pivotally supported by means of bearings 21 on axis 9. When piston rod 22 of working cylinder 20 retracts, axis 9 is drawn upwards, so that the clearing mechanism is also raised by bearings 21 which have been raised in the process. During operation, working cylinder 20 is switched to the floating position, so that the clearing mechanisms can automatically lift themselves, for example, to compensate for an uneven ground surface. Bearings 21 are guided along axes 9 and 9'.

While only a single embodiment has been shown and described it is obvious that many changes and modifications may be made thereunto without departing from the spirit and scope of the invention.

What is claimed is:

1. A mobile device for turning over or mixing accumulations of organic waste materials maturing to compost at fixed dump sites, said device having a steerable chassis with working tracks enabling it to advance through the accumulation, and having a mechanism for mixing the waste picked up while driving through and, after being thoroughly mixed, re-depositing the waste behind the device, comprising:

a clearing mechanism disposed on the front side of the chassis and in the area in front of each working track of the chassis for clearing a track path as the chassis moves through the waste material;

said clearing mechanism comprising a mixing mechanism, a guide shield disposed in front of the intake of said mixing mechanism, and working clearing tools disposed on a guide surface within said mixing mechanism;

each clearing tool comprising a disk, and a drive element containing said disk for rotating the disks in front of the guide surface, and excavating projections being provided on said disks;

each disk projection comprising a strip extending radially from said disk and projecting out of the plane of said disk;

a hydraulic motor coupled to said drive element of each clearing tool for rotating said disks; and a scraper strip disposed on the lower edge of each guide surface.

2. The device according to claim 1 wherein said clearing mechanism is pivotally hinged about a vertical axis on an outside corner of the chassis.

3. The device according to claim 1 comprising means for vertically raising and lowering each clearing mechanism.

4. The device according to claim 1 wherein said scraper strip is rubber.

5. The device according to claim 4 comprising a guide plate disposed on the front, open edge of each guide surface, said guide plate being disposed at an angle to said guide surface, being approximately aligned in parallel to the longitudinal axis of the chassis during operation.

6. The device according to claim 5 comprising a wear strip disposed on the lower edge of each guide plate.

7. The device according to claim 6 wherein said wearing strip is constructed of steel.

* * * * *